United States Patent Office.

HENRY W. WEEDON, OF HIGH POINT, NORTH CAROLINA.

Letters Patent No. 82,459, dated September 22, 1868.

IMPROVED SOAP AND DETERGENT COMPOUND.

*The Schedule referred to in these Letters Patent and making part of the same.*

TO ALL WHOM IT MAY CONCERN:

Be it known that I, HENRY W. WEEDON, of High Point, in the county of Guilford, in the State of North Carolina, have discovered a very Efficient and Economical Compound to be Used as a Detergent of all manner of filth, dirt, oil, tar, and all oil-paints, in water, cold or hot, hard or soft.

The nature of my invention consists in the production of a compound not readily decomposed by the impurities often found in the waters used for the purposes of ebullition, as lime, soda, &c., and so may be used as a detergent in any kind of weather.

To enable others skilled in labor successfully to make and use this compound, I will proceed to give the ingredients of which it is composed, together with the process of making and using it.

First, I take six quarts of any clean water, hard or soft; six pounds of chalk; half a pound of sal-soda; half an ounce of *aqua ammonia;* one ounce of *oleum terebinthina.* Mix together; boil five minutes; allow it to cool, and it is ready for use, as follows:

I take of the compound thus produced, three pounds; six gallons of hard or soft water; two ounces of *oleum terebinthina;* one ounce of *aqua ammonia;* one pound of sal-soda. Mix together, and boil five minutes, and a beautiful, clear, jelly-soap is the result.

Wet the goods; apply the compound by rubbing gently over the soiled parts; pack them in a tub; let them stand half an hour; then put them in a pot of boiling water, and boil from fifteen to thirty minutes, or until clean, keeping them all the time under water; rinse in clear water, and they are clean.

The advantages claimed for this compound are the following:

First, it can be manufactured at less than half the cost of any soap ever produced.

Secondly, it may be used successfully in any kind of water, cold or hot, hard or soft. It does best, however, in hot water.

Thirdly, it so modifies the action of boiling water on woollen goods that their fibres do not contract under its influence, and your woollen garment is as large after boiling as before.

Fourth, it does not decompose the colors of goods, and your prints and stripes are as brilliant after washing as before.

What I claim as my invention, and desire to secure by Letters Patent, is—

The particularly-specified combination of ingredients, and the definite quantities of the same, as set forth.

HENRY W. WEEDON.

Witnesses:
    W. P. PUGH,
    J. Q. PITTS.